(12) United States Patent
Pfeffer et al.

(10) Patent No.: US 9,068,510 B2
(45) Date of Patent: Jun. 30, 2015

(54) MACHINED SPRINGS FOR INJECTOR APPLICATIONS

(75) Inventors: Brett A. Pfeffer, Waukee, IA (US); Mark A. Caples, Ankeny, IA (US)

(73) Assignee: Delavan, Inc, West Des Moines, IA (US)

( * ) Notice: Subject to any disclaimer, the term of this patent is extended or adjusted under 35 U.S.C. 154(b) by 760 days.

(21) Appl. No.: 13/302,477

(22) Filed: Nov. 22, 2011

(65) Prior Publication Data

US 2013/0126641 A1    May 23, 2013

(51) Int. Cl.
| | |
|---|---|
| F02M 59/00 | (2006.01) |
| F02C 7/232 | (2006.01) |
| F02M 61/20 | (2006.01) |
| F02M 61/18 | (2006.01) |
| B05B 1/14 | (2006.01) |
| B05B 15/00 | (2006.01) |
| F16F 1/04 | (2006.01) |
| F16F 1/02 | (2006.01) |
| B01D 29/11 | (2006.01) |
| F02C 9/28 | (2006.01) |

(52) U.S. Cl.
CPC ............... *F02C 7/232* (2013.01); *F02M 61/20* (2013.01); *F02M 61/18* (2013.01); *B05B 1/14* (2013.01); *B05B 15/008* (2013.01); *F16F 1/042* (2013.01); *F16F 1/02* (2013.01); *B01D 29/111* (2013.01); *F02C 9/285* (2013.01); *F05D 2260/38* (2013.01); *F05D 2260/52* (2013.01)

(58) Field of Classification Search
CPC ....... F02M 61/18; F02M 61/20; F02M 61/16; F02M 47/04; F02M 47/025; B05B 15/008; B05B 1/14; F16F 1/042; F16F 1/02; B01D 29/111; B01D 21/0012
USPC ............. 239/533.2, 533.3, 533.8, 533.9, 575, 239/590, 590.3; 267/166, 167, 180, 181; 210/148, 497.1
See application file for complete search history.

(56) References Cited

U.S. PATENT DOCUMENTS

| | | | |
|---|---|---|---|
| 5,062,619 A * | 11/1991 | Sato | 267/181 |
| 7,175,112 B2 * | 2/2007 | Uhlmann | 239/533.9 |
| 7,513,372 B2 * | 4/2009 | Carew | 210/497.1 |
| 7,950,596 B2 * | 5/2011 | Venkataraghavan et al. | 267/180 |
| 8,378,218 B2 * | 2/2013 | Dicken et al. | 174/126.1 |

* cited by examiner

*Primary Examiner* — Steven J Ganey
(74) *Attorney, Agent, or Firm* — Locke Lord LLP; Scott D. Wofsy; Joshua L. Jones (57) ABSTRACT

A machined spring for injector applications includes opposed first and second spring bases separated apart along a longitudinal axis. A spring body connects the first and second spring bases. The spring body includes a generally annular wall with a plurality of spring channels defined therethrough, such as machined channels. Exemplary applications for such machined springs include liquid strainers, valve components, and structural components for accommodating thermal expansion in injectors.

18 Claims, 12 Drawing Sheets

MACHINED SPRINGS FOR INJECTOR APPLICATIONS

BACKGROUND OF THE INVENTION

1. Field of the Invention

The present invention relates to injectors, and more particularly to springs used to bias injector components.

2. Description of Related Art

Traditional springs are used in a variety of applications in injectors and nozzles, such as fuel injectors for gas turbine engines. Exemplary uses of springs in conventional injectors include use in biasing fuel strainers into position, biasing valve hold down components away from external injector walls, biasing scheduling valve components, and the like. Traditional springs in such applications can suffer from loss of spring force, can be difficult to assemble, add to part count, and take up considerable space. For example, traditional wave springs used to bias valve components away from injector walls can loose their spring due to heat from welding operations on adjacent components. The welding heat can anneal the spring and thereby render the spring ineffective.

Such conventional methods and systems have generally been considered satisfactory for their intended purpose. However, there is still a need in the art for injector springs that allow for improved performance and that can provided for lower part count, easier assembly, and smaller size envelope and weight. There also remains a need in the art for such injector springs that are easy to make and use. The present invention provides a solution for these problems.

SUMMARY OF THE INVENTION

The subject invention is directed to a new and useful machined spring for injector applications. The machined spring includes opposed first and second spring bases separated apart along a longitudinal axis. A spring body connects the first and second spring bases. The spring body includes a generally annular wall with a plurality of spring channels defined therethrough, such as machined channels.

In certain embodiments, the plurality of spring channels includes first and second helical spring channels. The helical spring channels wind in counter-rotational directions around the annular wall for uniform spring stiffness and reduced buckling of the spring body to one side under a substantially axial load.

At least one of the spring bases can include a liquid strainer. The liquid strainer can include a bulkhead separating a flow passage within the generally annular wall from a flow passage within the liquid strainer, wherein a plurality of bores are defined through the liquid strainer for passage of liquid from inside the generally annular wall through the bores and around the bulkhead to the exterior of a strainer mesh for straining liquid passing through the mesh into the flow passage within the liquid strainer. It is also contemplated that the liquid strainer can include a circumferential land extending outward from an upstream portion of the liquid strainer with a plurality of axial channels therethrough for passage of liquid out from inside the generally annular wall through the helical spring channels, through the axial channels to the exterior of a strainer mesh for straining liquid passing through the mesh into the flow passage within the liquid strainer. At least one of the helical spring channels can include a radial aperture configured to permit uninterrupted liquid flow therethrough even when the helical spring channels are fully compressed axially.

It is also contemplated that at least one of the spring bases can include a valve cross-over configured and adapted to allow flow of liquid out from inside the generally annular wall through the valve cross-over for use in a valve. In certain embodiments, at least one of the spring bases includes a valve hold down component with an axially extending standoff configured to separate valve components within the generally annular wall from injector components outside the generally annular wall.

In accordance with certain embodiments, the spring channels are circumferential spring channels, wherein each circumferential spring channel winds circumferentially around a portion of the annular wall to provide flexibility in the direction of the longitudinal axis and stiffness in a torque direction around the longitudinal axis circumferentially. There can be a plurality of pairs of the spring channels, each pair having an axially extending wall section separating the two channels at each channel end. The axially extending wall sections between channel ends of each axially adjacent pair of channels can be circumferentially offset from one another, by about 90° for example, for increasing uniformity in longitudinal flexibility of the annular wall. Each channel end can include an enlarged terminus for reducing stress concentrations.

The invention also provides a fuel injector. The fuel injector includes an injector body having an upstream inlet end and opposed downstream end for injecting fluids therefrom. A machined spring, as described above, is mounted between the upstream inlet and downstream ends of the injector body. The machined spring can include a liquid strainer as described above for straining liquids flowing through the injector body.

In certain embodiments, a valve is mounted in the injector body to regulate liquid flow therethrough. In such embodiments, the machined spring can include a valve cross-over mounted in the valve to allow flow of liquid out from inside the generally annular wall through the valve cross-over under a predetermined pressure range applied at the inlet end of the injector body.

It is also contemplated that the injector can include a valve mounted in the injector body to regulate liquid flow therethrough. At least one of the spring bases of the machined spring includes a valve hold down component as described above with the axially extending standoff separating the valve within the generally annular wall from injector components outside the generally annular wall.

In yet another embodiment, each machined spring channel is a circumferential spring channel as described above, wherein the first spring base is mounted to the inlet end of the injector body. The second spring base is mounted to a feed arm of the injector. A liquid conduit extends through the annular wall. The machined spring is configured and adapted to accommodate differential thermal expansion of the feed arm and liquid conduit and to provide stiffness to the inlet end of the injector body in torsion.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
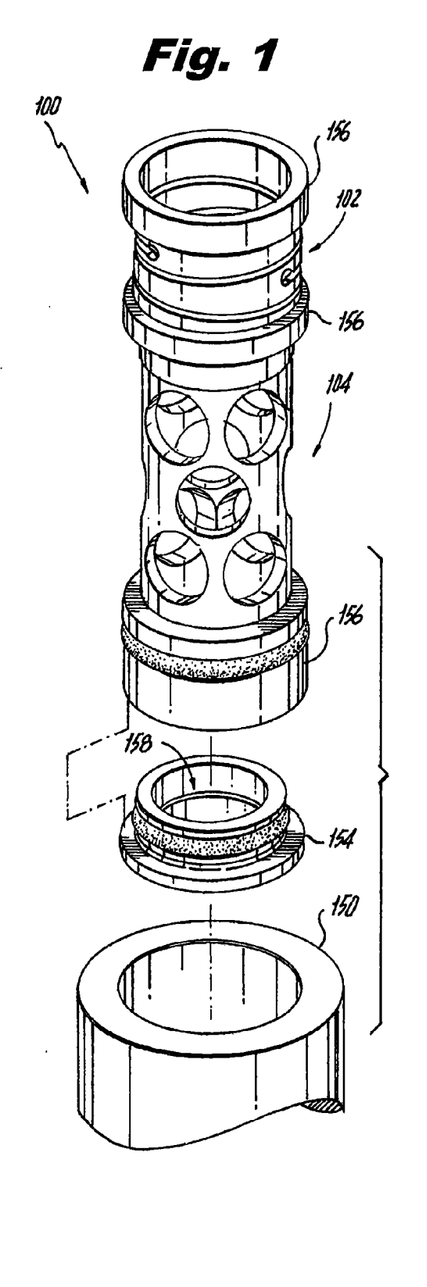
FIG. 1 is a perspective view of an exemplary embodiment of a machined spring including a strainer constructed in accordance with the present invention, showing the three bearing surfaces.

Reference will now be made to the drawings wherein like reference numerals identify similar structural features or aspects of the subject invention. For purposes of explanation and illustration, and not limitation, a partial view of an exemplary embodiment of a machined spring in accordance with the invention is shown in FIG. 1 and is designated generally by reference character 100. Other embodiments of machined springs in accordance with the invention, or aspects thereof, are provided in FIGS. 2-24, as will be described. The systems and methods of the invention can be used to improve spring performance, reduce part count, reduce part size, and to simplify assembly and manufacture, for example in fuel injectors for gas turbine engines.

Figure 2:
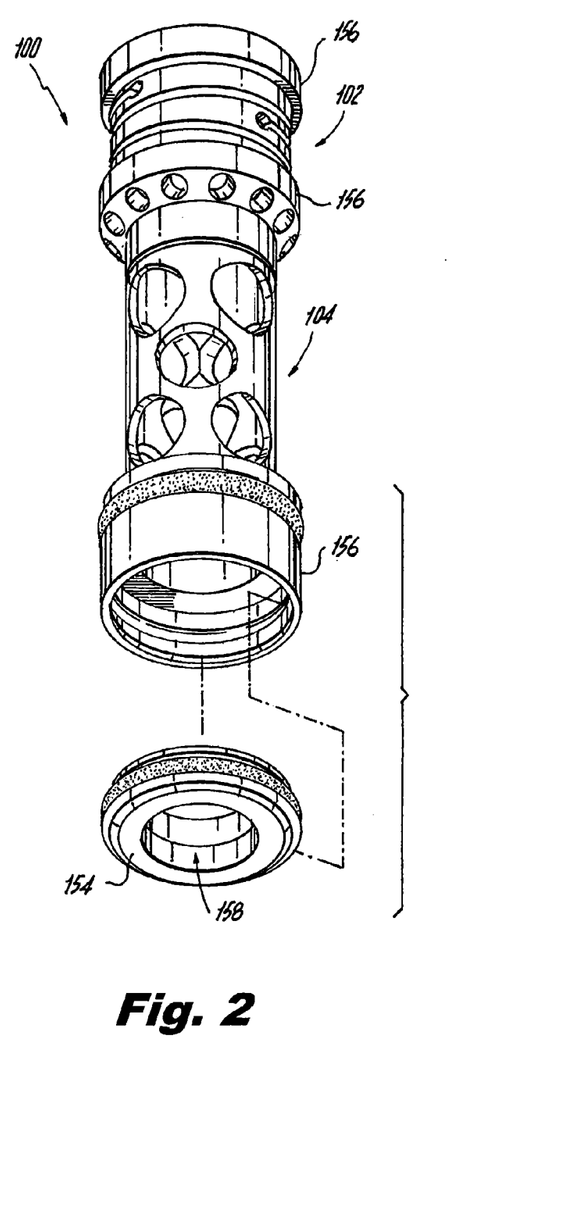
FIG. 2 is a perspective view of the machined spring with strainer of FIG. 1, showing the strainer outlet.
Figures 3, 4:
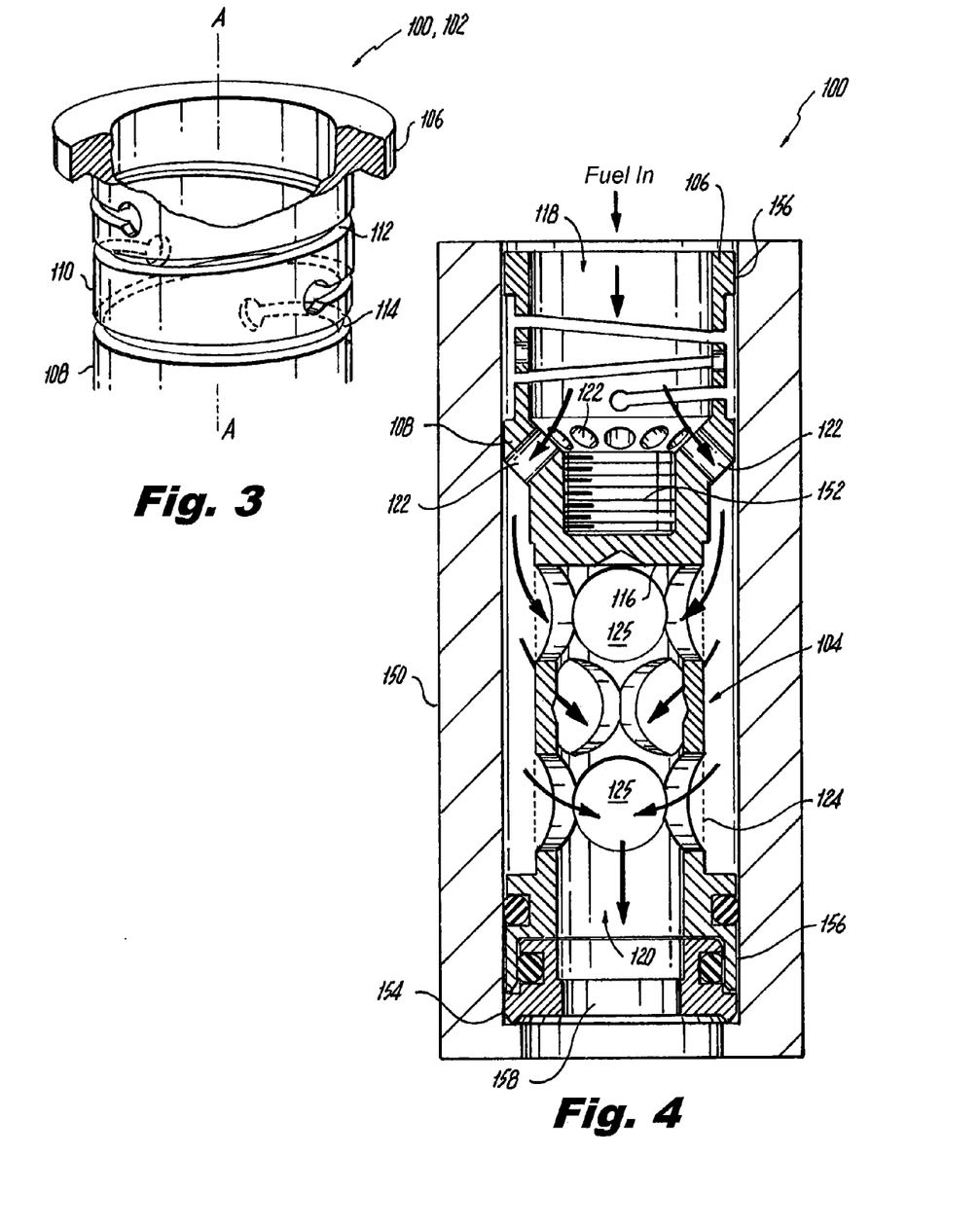
FIG. 3 is a partially cut-away perspective view of a portion of the machined spring and strainer of FIG. 1, showing the two counter-wound helical spring channels.
FIG. 4 is a cross-sectional elevation view of the machined spring and strainer of FIG. 1, schematically showing the fuel flow path through the strainer.

Machined spring 100 includes a spring portion 102 and a liquid strainer 104 integral with spring portion 102. FIGS. 1 and 2 show the spring portion 102 and integral liquid strainer 104 from upstream and downstream perspectives, respectively. FIG. 3 shows spring portion 102 including opposed first and second spring bases 106 and 108 separated apart along a longitudinal axis A. A spring body 110 connects the first and second spring bases 106 and 108.

Spring body 110 includes a generally annular wall with two helical spring channels 112 and 114 defined therethrough. Spring channels 112 and 114 are machined channels which can be formed in the annular wall by a milling process, electrical discharge machining, a laser process, or the like. Spring channels 112 and 114 wind in counter-rotational directions around the annular wall. Said another way, spring channel 114 winds in a clockwise direction ascending around axis A as oriented in FIG. 3, and spring channel 112 winds in a counter-clockwise direction. Having separate spring channels wound in opposite directions advantageously provides uniform spring stiffness and reduces the tendency for buckling of spring body 110 to one side under a substantially axial load when compared with helical springs having only one winding direction.

With reference now to FIG. 4, spring base 108 includes liquid strainer 104. Liquid strainer 104 includes a bulkhead 116 separating a flow passage 118 within the annular wall of spring body 110 from a flow passage 120 within liquid strainer 104. A plurality of bores 122 are defined through liquid strainer 104 for passage of liquid from passage 118 inside the generally annular wall, through bores 122, and around bulkhead 116 to the exterior of a strainer mesh 124 for straining liquid passing through mesh 124 and strainer bores 125 into flow passage 120 within liquid strainer 104. This flow path is generally indicated by the heavy arrows in FIG. 4. Mesh 124 is not shown in FIGS. 1-2 to avoid obscuring underlying strainer structure. The largely axial flow, with liquid moving from external of strainer mesh 124 into the axial flow path, is advantageous because external pressure on a strainer allows for high burst pressure compared to traditional strainer configurations.

Machined spring 100 is compressed so that liquid strainer 104 can be secured, e.g., bottomed, in a conduit 150 which can run between upstream and downstream ends of an injector, for example. The preload force provided by spring body 110, along with the three bearing guide surfaces 156 on the outer diameter of the machined spring 100, reduce the effect vibration loads may have on the device. The internal thread 152 aids in removal of strainer 104 for service or replacement. Outer o-ring 154 provides a seal to catch debris when strainer 104 is removed for service, and provides a trim orifice 158 for regulating flow. Having the spring and strainer integrated together reduces difficulties during assembly arising from a separate spring.

Figure 5:
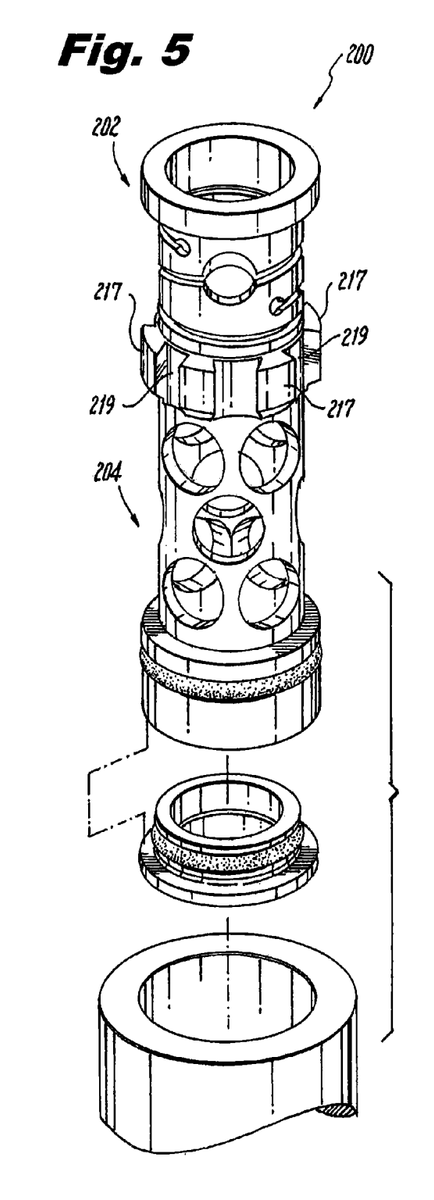
FIG. 5 is a perspective view of another exemplary embodiment of a machined spring including a strainer constructed in accordance with the present invention, showing the land with axial channels.
Figure 6:
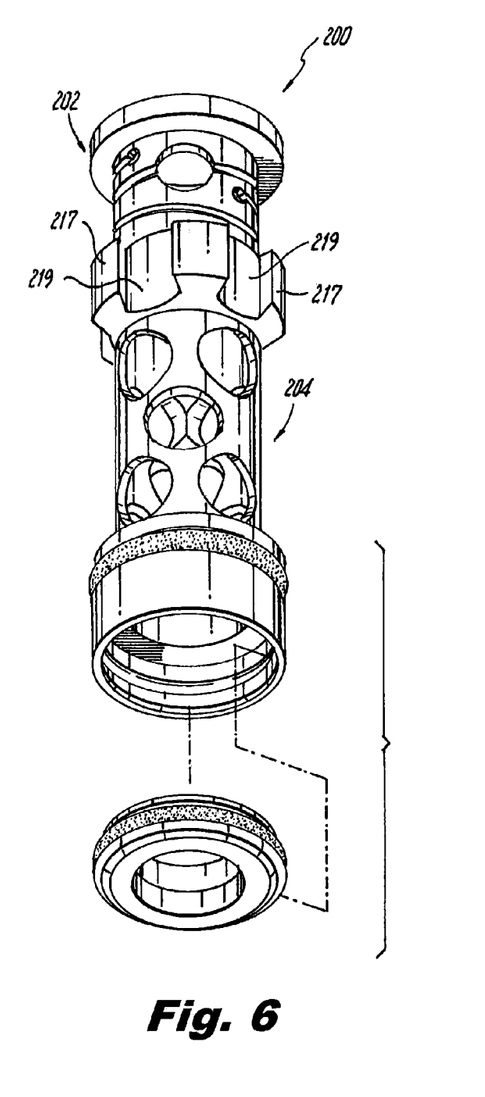
FIG. 6 is a perspective view of the machined spring with strainer of FIG. 5, showing the strainer outlet.
Figure 7:
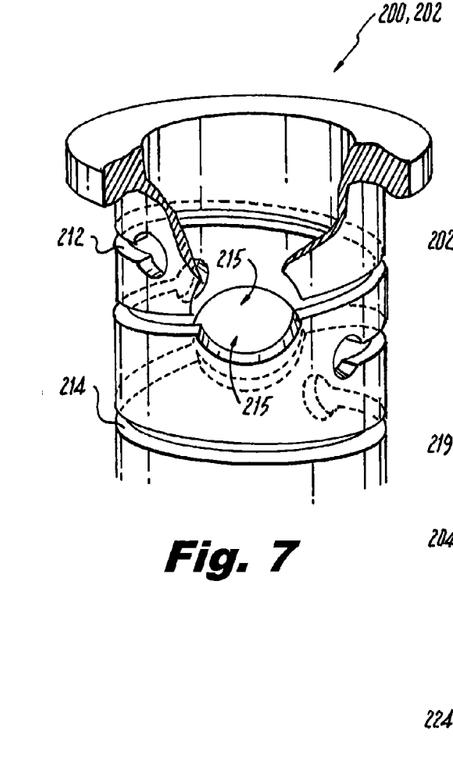
FIG. 7 is a partially cut-away perspective view of a portion of the machined spring and strainer of FIG. 5, showing the radial apertures of the helical spring channels for providing uninterrupted flow even when the helical spring channels are compressed.
Figure 8:
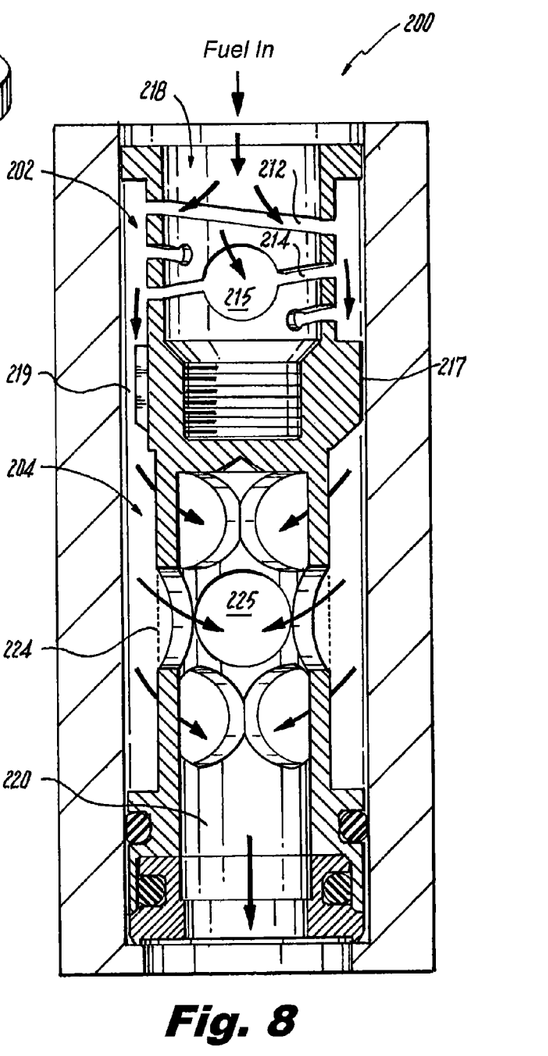
FIG. 8 is a cross-sectional elevation view of the machined spring and strainer of FIG. 5, schematically showing the fuel flow path through the strainer.

Referring now to FIGS. 5-6, another exemplary embodiment of a machined spring 200 has a spring portion 202 and liquid strainer 204 much as described above but with a different flow path. Machined spring 200 includes a circumferential land 217 extending outward from an upstream portion of liquid strainer 204 with a plurality of axial channels 219 therethrough. As indicated by the heavy lines in FIG. 8, the flow path for straining liquid starts inside passage 218, from which liquid flows out through the helical spring channels 212 and 214, around bulkhead 216 through the axial channels 219 to the exterior of a strainer mesh 224 (which is only shown in FIG. 8) where the liquid is strained by passing through mesh 224 and strainer bores 225 into flow passage 220 within liquid strainer 204. Since the flow path includes helical spring channels 212 and 214, each of the helical spring channels 212 and 214 includes a radial aperture 215, which are indicated in FIG. 7. Due to the relatively large size of radial apertures 215 compared to spring channels 212 and 214, even if spring channels 212 and 214 are compressed axially, radial apertures 215 permit uninterrupted liquid flow therethrough.

Figure 9:
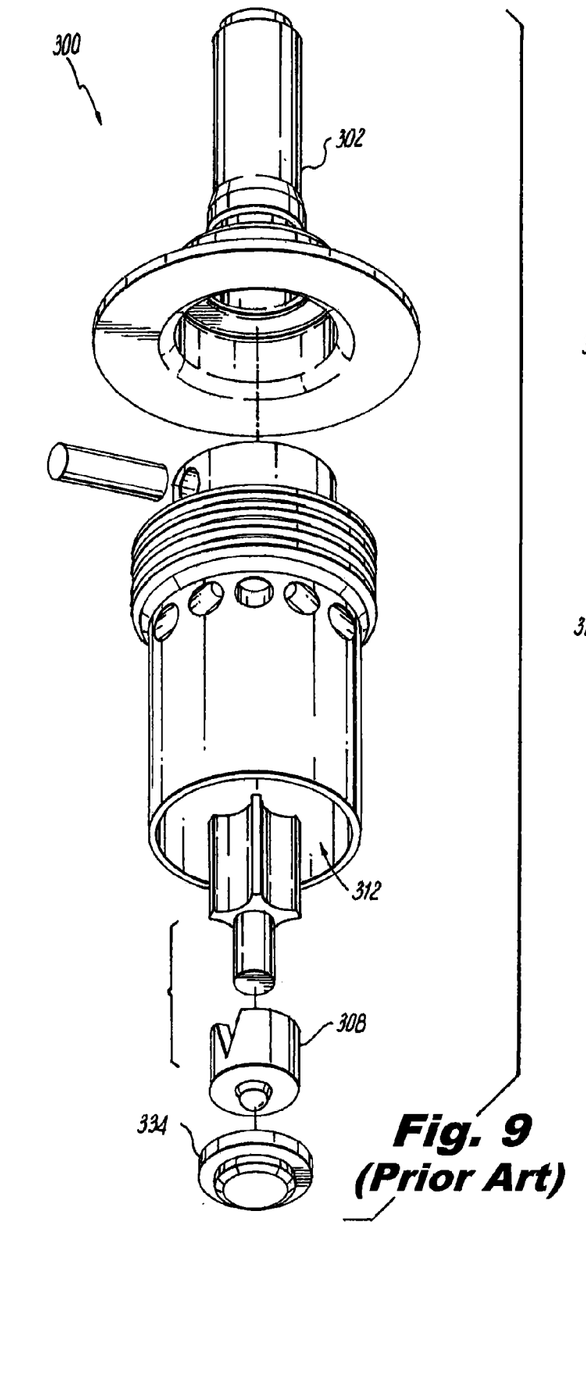
FIG. 9 is an exploded perspective view of a prior art injector with a scheduling valve.
Figure 10:
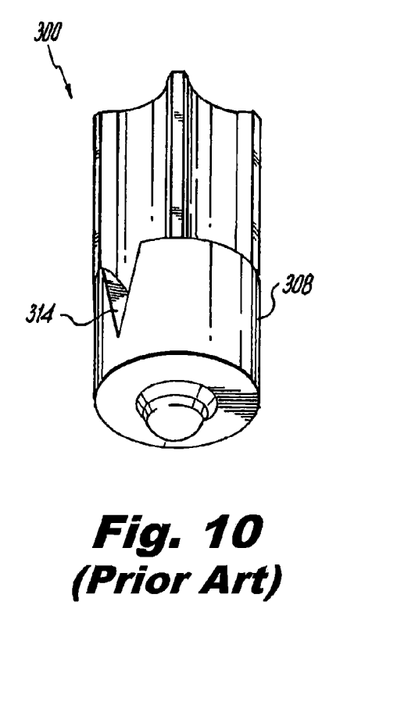
FIG. 10 is a perspective view of the scheduling valve member of the injector of FIG. 9.
Figure 11:
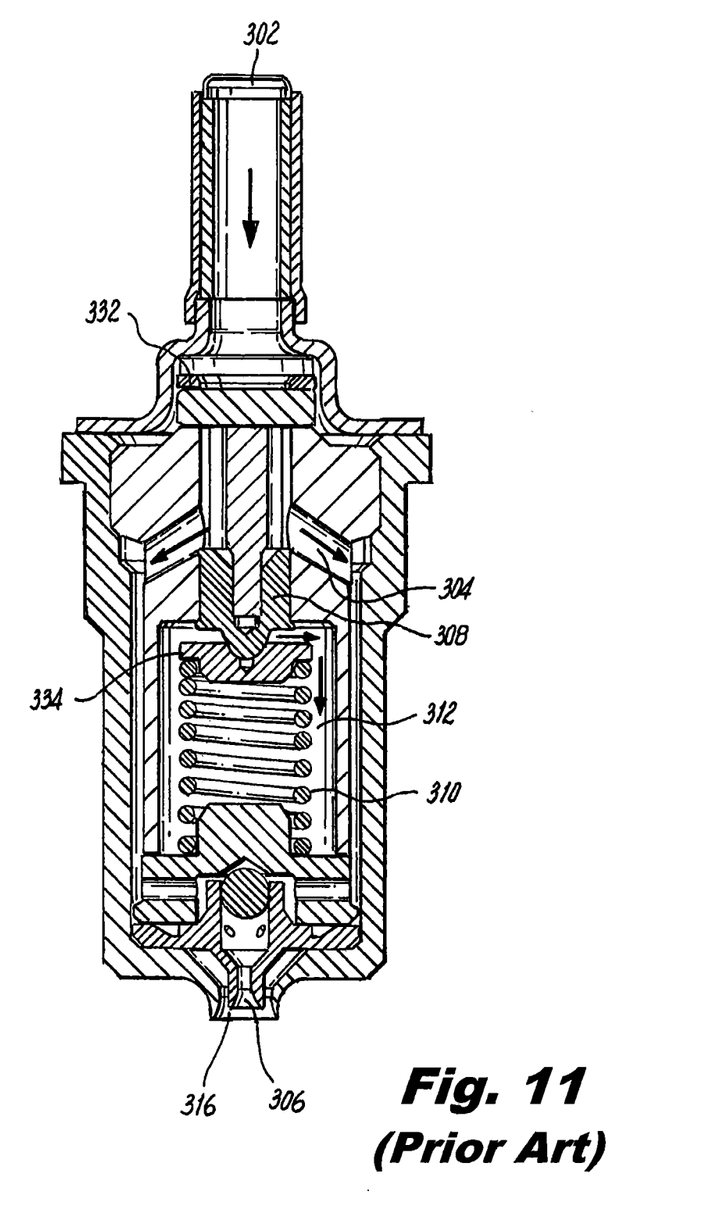
FIG. 11 is a cross-sectional elevation view of the injector of FIG. 9, showing the conventional spring biasing the scheduling valve member.

Referring now to FIGS. 9-11, a prior art injector 300 is shown, in which two liquid flow circuits are provided. Fuel entering inlet 302 can pass through pilot circuit 304 to be discharged from pilot nozzle 306, shown in FIG. 11. As pressure at inlet 302 increases, the pressure on plunger 308, shown in FIG. 9, provides increasing force to compress spring 310, which is shown in FIG. 11. As plunger 308 moves farther into chamber 312, more and more of scheduling feature 314, shown in FIG. 10, opens into main circuit 312, allowing an increase of liquid flow through main circuit 312 to issue from main nozzle 316. Due to the shape of scheduling feature 314, the greater the pressure at inlet 302, the greater the flow will be passing through main circuit 312. Flow paths for the main and pilot circuits 312 and 304 are indicated schematically with heavy arrows in FIG. 11.

Figure 12:
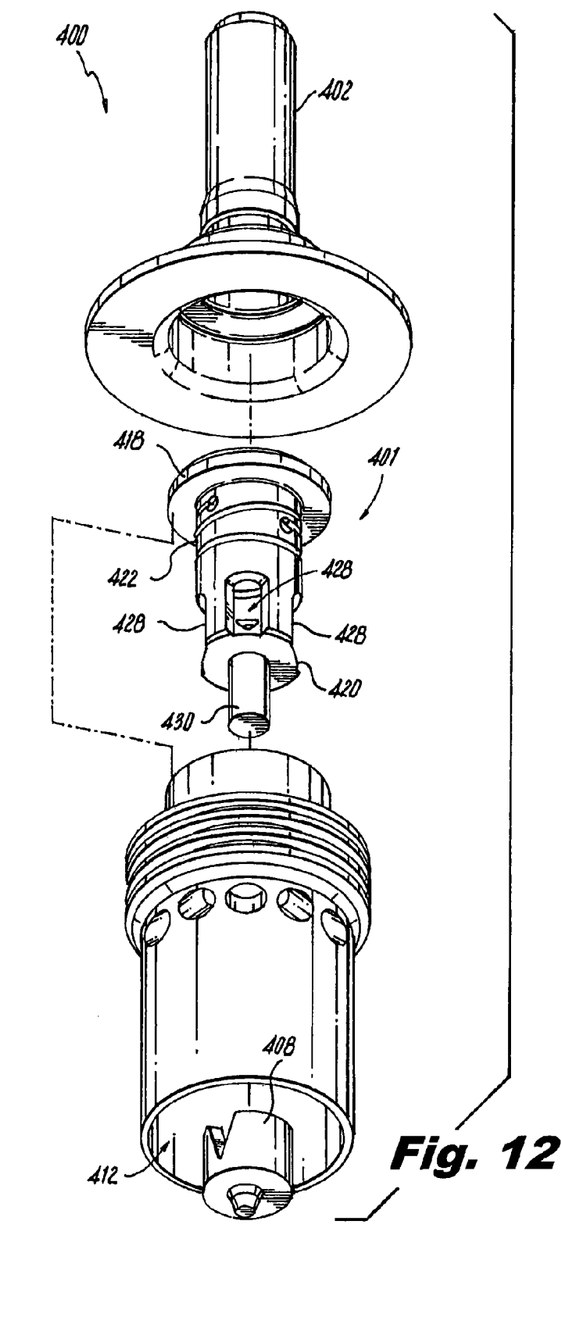
FIG. 12 is an exploded perspective view of an exemplary embodiment of an injector constructed in accordance with the present invention, showing the machined spring for biasing the scheduling valve member.
Figure 13:
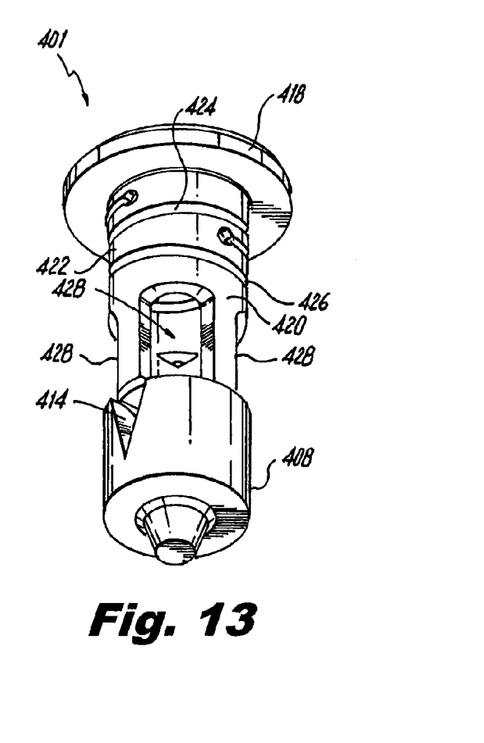
FIG. 13 is a perspective view of the machined spring and scheduling valve member of FIG. 12, showing the helical spring channels.
Figures 14, 15:
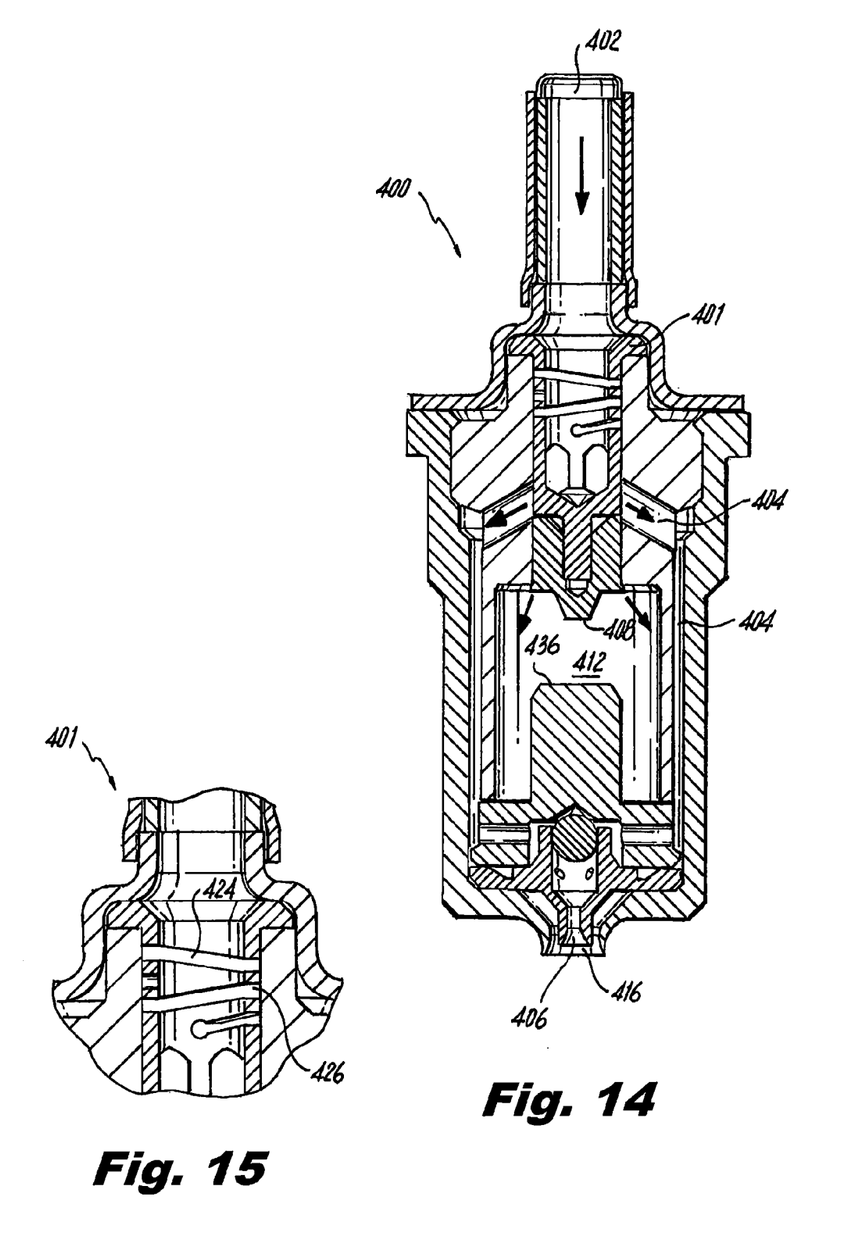
FIG. 14 is a cross-sectional elevation view of the injector of FIG. 12, showing the assembly of the machined spring and scheduling valve member in the injector.
FIG. 15 is a cross-sectional elevation view of a portion of the injector of FIG. 14, showing the helical spring channels.

With reference now to FIGS. 12-15, an exemplary embodiment of an injector 400 is shown, which utilizes a machined spring 401. The basic valve flow regulation of injector 400 is similar to that described above for injector 300, including the uses of inlet 402 shown in FIG. 12, main and pilot circuits 412 and 404 shown in FIG. 14, plunger 408 with scheduling feature 414 shown in FIG. 13, and main and pilot nozzles 416 and 406 shown in FIG. 14. However, machined spring 401 offers certain advantages over traditional spring 310. Much as described above with respect to machined spring 100, machined spring 401 includes first and second spring bases 418 and 420 connected by a spring body 422 with two counter-winding helical spring channels 424 and 426 defined therethrough, as shown in FIG. 15. As pressure builds at inlet 402, helical spring channels 424 and 426 are stretched in a predetermined manner, extending scheduling feature 414 further into main circuit 412. The spring constant and desired flow scheduling must be matched for each given application.

Liquid from inlet 402 reaches both pilot and main circuits 404 and 412 by passing from within the generally annular wall of spring body 422 out by way of valve cross-over 428, which is formed in spring base 420 as shown in FIGS. 12-13. Flow paths for the main and pilot circuits 412 and 404 are indicated schematically with heavy arrows in FIG. 14. Plunger 408 with scheduling feature 414 form a scheduling valve member, and spring base 420 includes a peg 430 for mounting the scheduling valve member to machined spring 401. Stop 436, identified in FIG. 14, provides a mechanical stop to prevent excessive inward travel of plunger 408. The length of injector 400 can be shortened, including shortening stop 436 without reducing the stroke length for plunger 408. Shortening injector 400 can advantageously reduce its weight and envelope size.

Three items, namely valve retainer 332, spring seat 334, and spring 310, all shown in FIG. 11, can essentially be replaced by machined spring 401. Due to the counter-winding of helical spring channels 424 and 426, buckling to one side as in spring 310 is reduced or eliminated, increasing the wear life of the moving parts in injector 400. In short, advantages of machined spring 401 over traditional spring 310 include reduced part count, reduced bearing surfaces for buckling issues, reduced need for hardened valve components (e.g., stainless steel valve components and heat treatment therefore, such as in typical 400SS valve components), and reduced valve envelope size and weight.

Figures 16, 17:
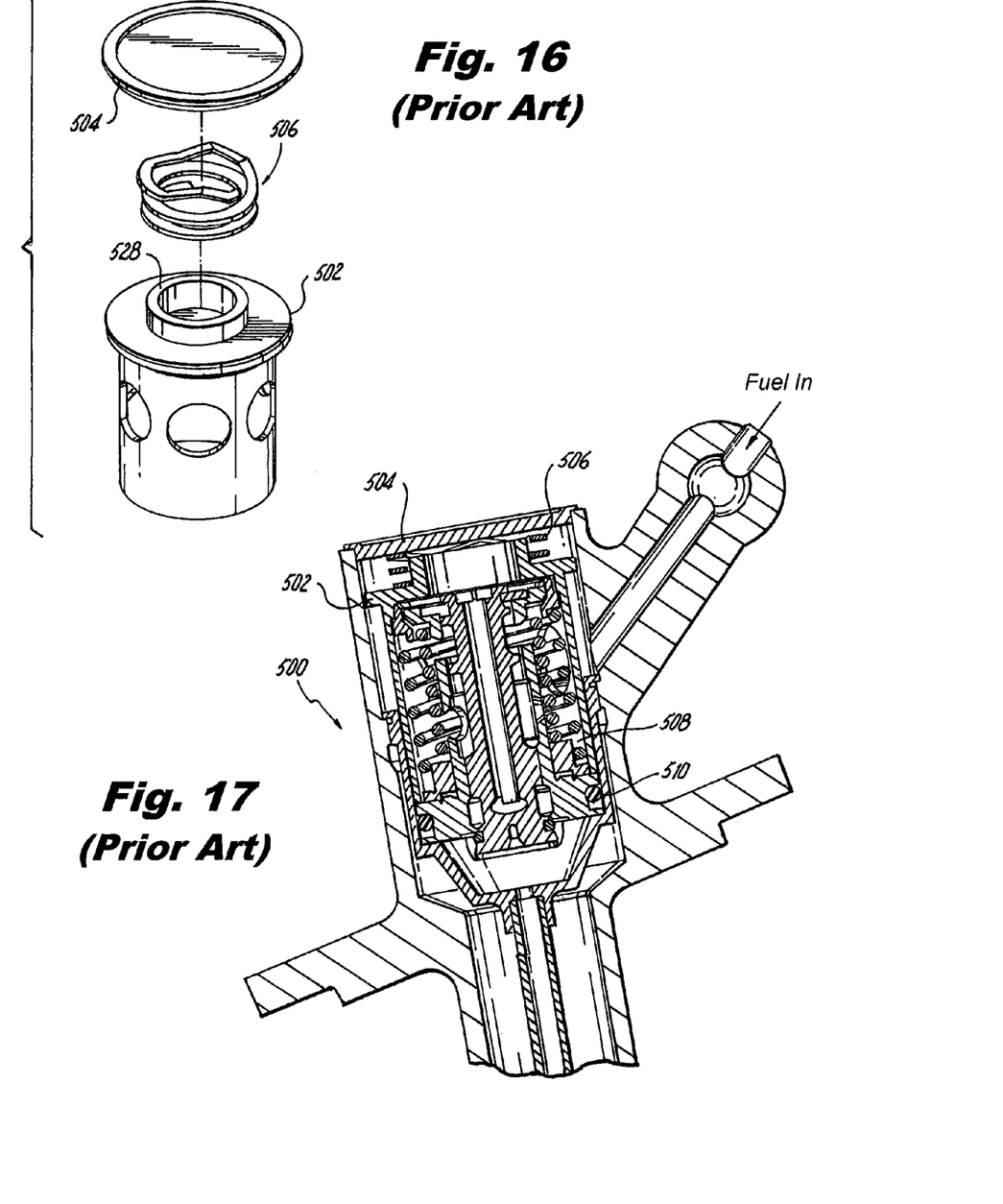
FIG. 16 is a perspective view of a prior art valve hold down portion of a fuel injector, showing the hold down spring and injector end wall.
FIG. 17 is a cross-sectional elevation view of the injector of FIG. 16, showing the valve assembled within the valve hold down component with the hold down spring compressed between the injector end wall and the valve hold down component.

Referring now to FIGS. 16-20, another advantageous use of machined springs in injectors is described. FIGS. 16-17 show a prior art valve hold down component 502 in an injector 500. Hold down component 502 is biased away from injector wall 504 with a traditional wave spring 506 in compression therebetween with guide 528 holding wave spring 506 in position. Hold down component 502 in turn holds valve components 508 in proper position within valve seat 510. One disadvantage of this valve hold down configuration is that if wave spring 506 looses its spring strength, valve hold down component 502 can be rendered useless in holding valve components 508 in place. Often during assembly of injectors such as injector 500, a welding process is performed to mount injector wall 504 in place. Wave spring 506 is in the heat affected zone and can be annealed during the welding process. Annealing wave spring 506 reduces or eliminates its spring strength, rendering valve hold down component 502 inoperative.

Figures 18, 19, 20:
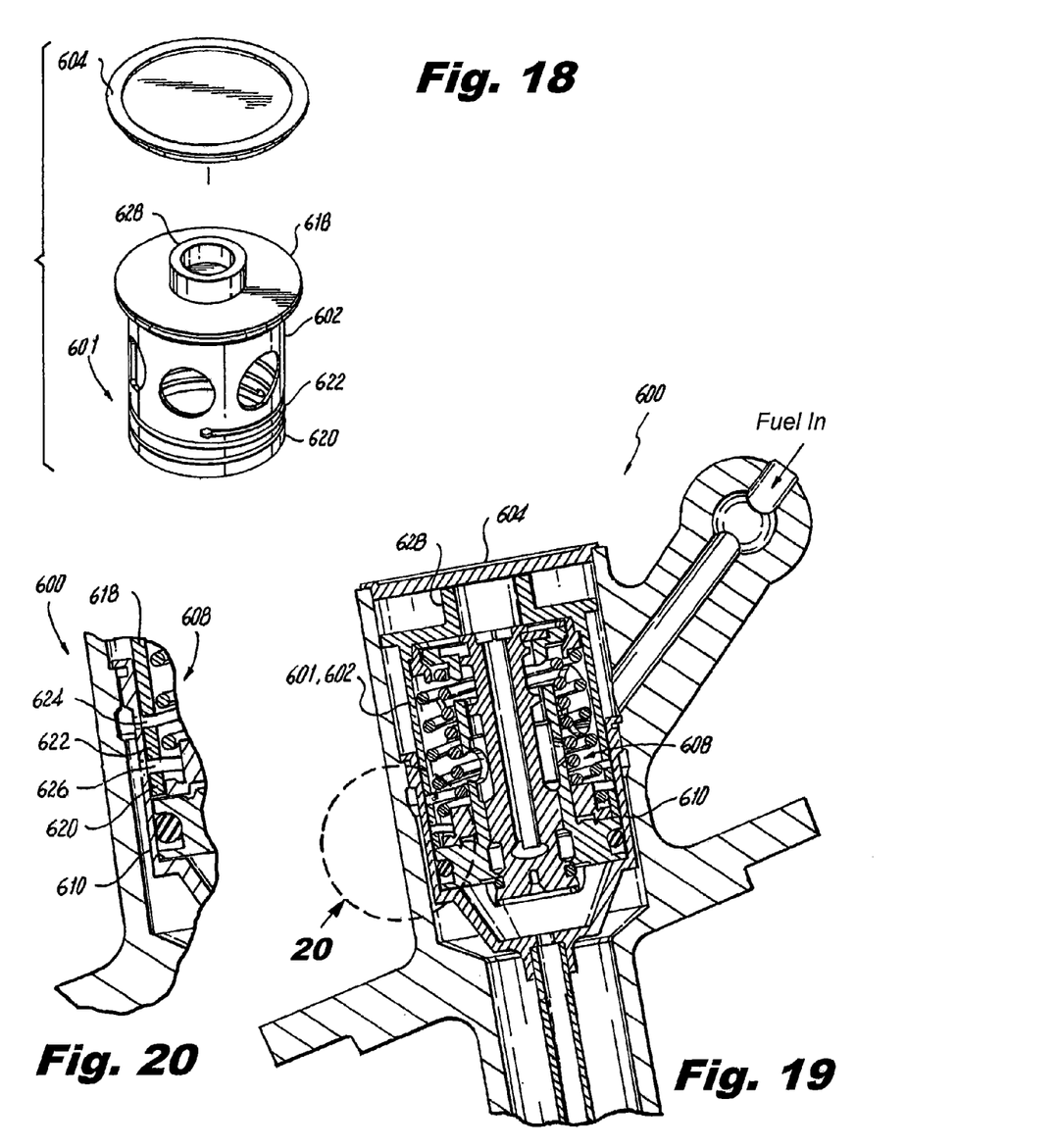
FIG. 18 is a perspective view of a portion of an exemplary injector constructed in accordance with the present invention, showing the machined spring of the valve hold down component.
FIG. 19 is a cross-sectional elevation view of the injector of FIG. 18, showing the machined spring compressed to hold down the valve.
FIG. 20 is a cross-sectional elevation view of the injector of FIG. 19, showing the helical spring channels.

Injector 600, shown in FIGS. 18-20, utilizes a machined spring 601 instead of traditional wave spring 506. Injector 600 includes injector wall 604, valve components 608 for regulating flow through injector 600, and valve seat 610 much as described above with respect to injector 500. Machined spring 601 includes first and second spring bases 618 and 620 connected by a spring body 622 with two counter-winding helical spring channels 624 and 626 defined therethrough as shown in FIG. 20, much as described above with respect to machined spring 100. Spring base 618 includes a valve hold down component 602 with an axially extending guide 628. When injector 600 is assembled, guide 628 is pressed against injector wall 604 as shown in FIG. 19, with helical spring channels 624 and 626 in compression to hold valve components 608 in place in valve seat 610. Guide 628 serves as a standoff to space valve components 608 within the generally annular wall of spring body 622 from injector wall 604 and from the corresponding weld mounting injector wall 604 in place. Since spring body 622 is significantly spaced apart from injector wall 604, welding injector wall 604 in place will have a significantly reduced chance of annealing spring body 622. In other words, spring body 622 is much more likely to be outside the heat affected zone when welding injector wall 604 in place compared to injector 500, so machined spring 601 remains effective even after welding. Other advantages of machined spring 601 include reduced part count, since the spring and hold down components are combined, and reduced guide diameter for improved heat resistance (compare guide 628 in FIG. 18 to guide 528 in FIG. 16).

Figures 23, 24:
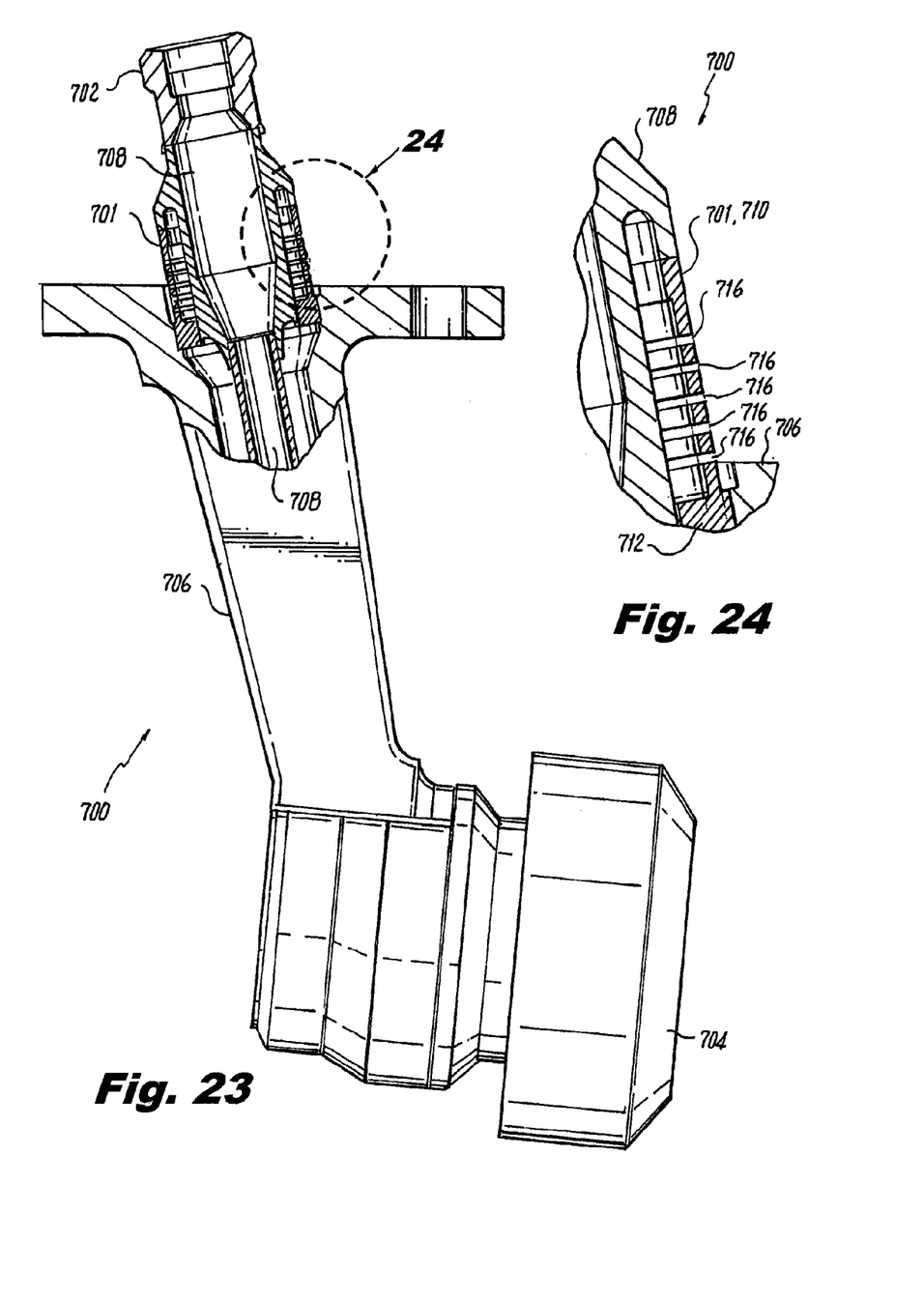
FIG. 23 is a partial cross-sectional elevation view of the injector of FIG. 21, showing the liquid conduit passing through the machined spring.
FIG. 24 is a cross-sectional elevation view of the injector of FIG. 23, showing the circumferential spring channels.

With reference now to FIGS. 21-24, another exemplary injector 700 and machined spring 701 are explained. As shown in FIG. 23, Injector 700 includes inlet 702 for receiving liquid, such as fuel, from an external source and outlet 704 for injecting an atomized spray of the liquid, for example into the combustor of a gas turbine engine. Due to potentially high operating temperatures, feed arm 706 can heat up significantly during operation, whereas liquid flowing through conduit 708 keeps the conduit 708 at a relatively cool temperature. Thus there is a potential for a significant thermal expansion gradient between feed arm 706 and conduit 708 in operation. Machined spring 701 is mounted at one end, e.g., spring base 710, to the inlet portion of conduit 708 as shown in FIG. 24, with the fluid conveying portion of conduit 708 running through the annular wall of spring body 714 as shown in FIG. 23. The opposite end of machined spring 701, e.g., spring base 712, is mounted to feed arm 706 as shown in FIG. 24. Since machined spring 701 is flexible along the longitudinal axis of conduit 708, differences in thermal expansion between feed arm 706 and conduit 708 can be accommodated by machined spring 701, thereby avoiding harmful thermally induced stresses.

Figures 21, 22:
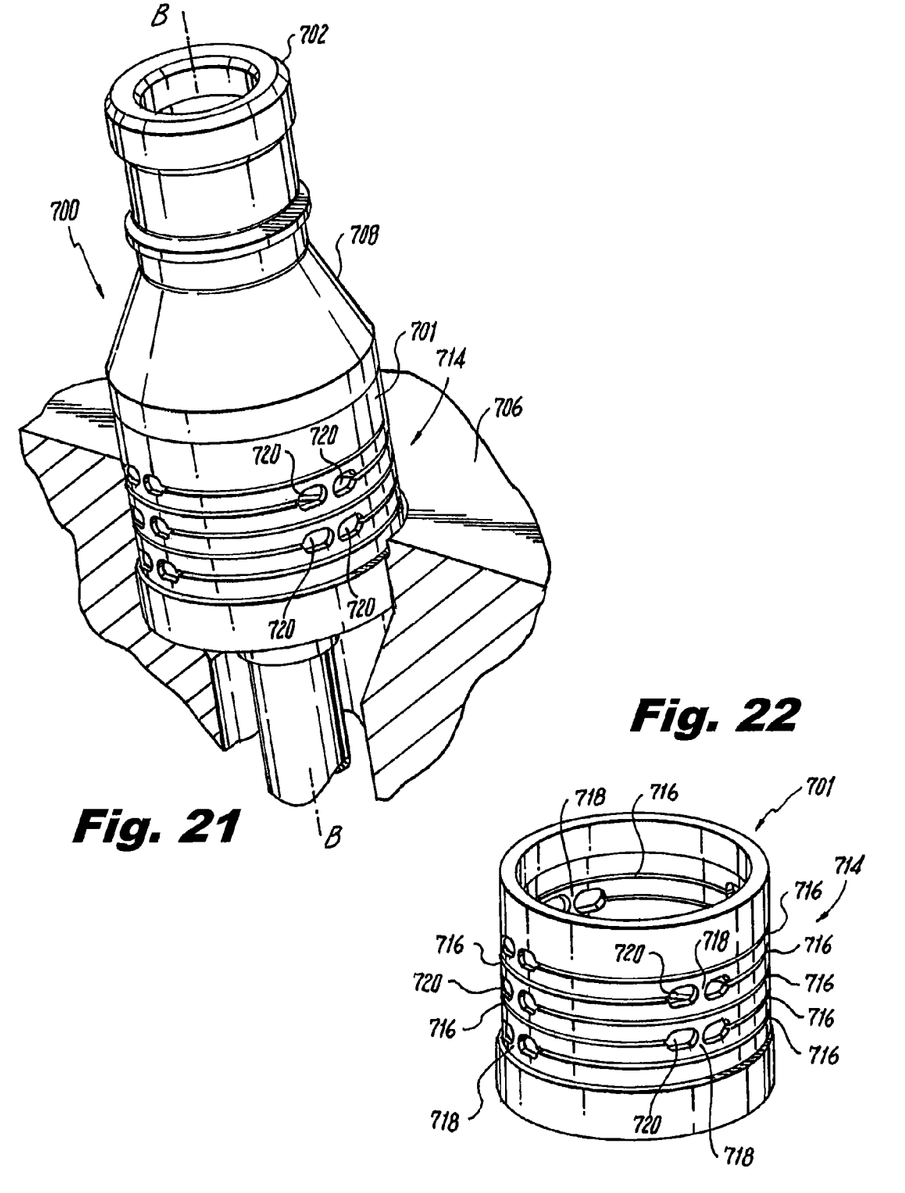
FIG. 21 is a perspective view of a portion of another exemplary injector constructed in accordance with the present invention, showing the machined spring mounted between the injector inlet and the feed arm.
FIG. 22 is a perspective view of the machined spring of FIG. 21, showing the axial wall sections between adjacent circumferential spring channels.

Referring now to FIGS. 21-22, machined spring 701 includes a spring body 714 defining an annular wall with a plurality of spring channels 716 defined therethrough. Unlike the helical spring channels described above, spring channels 716 are circumferential, i.e., each circumferential spring channel 716 winds circumferentially around a portion of the annular wall to provide flexibility in the direction of the longitudinal axis B and stiffness in a torque direction around the longitudinal axis B circumferentially. Each circumferential spring channel 716 is paired with another spring channel 716 on a common circumference. Each such pair of channels has an axially extending wall section 718 separating the two channels 716 at each channel end. The axially extending wall sections 718 of axially adjacent pairs of channels 716 are circumferentially offset from one another by about 90°.

This arrangement of circumferential channels and offset wall sections 718 provides for flexibility along the axial direction, and also allows for stiffness in torsion so torque can be developed around the circumferential direction. This can be particularly advantageous if a torque must be applied to inlet 702 during installation, for example to attach a threaded fuel supply line to inlet 702. This configuration also gives good uniformity in the longitudinal flexibility of the annular wall of spring body 714. Each spring channel end includes an optional enlarged terminus 720 for reducing stress concentrations, as do the other embodiments of spring channels described above. Machined spring 701 offers certain advantages over traditional measures, such as coiled conduits, used to accommodate differential thermal expansion of feed arms and liquid conduits therein. These advantages include simplified assembly, reduced weight, and use of a straight conduit rather than a more expensive coiled conduit. Optionally, a shield such as a telescoping tube, can be placed around the annular wall of spring body 714 to keep debris from entering channels 716.

The methods and systems of the present invention, as described above and shown in the drawings, provide for machined springs and injectors with superior properties including enhanced spring and injector performance, reduced part count, and reduced size envelope. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A machined spring comprising:
opposed first and second spring bases separated apart along a longitudinal axis; and
a spring body connecting the first and second spring bases, wherein the spring body includes a generally annular wall with a first helical spring channel defined therethrough, wherein the generally annular wall further includes a second helical spring channel defined therethrough, wherein the first and second helical spring channels both wind in counter-rotational directions around the annular wall for uniform spring stiffness and reduced buckling of the spring body to one side under a substantially axial load.

2. A machined spring comprising:
opposed first and second spring bases separated apart along a longitudinal axis; and
a spring body connecting the first and second spring bases, wherein the spring body includes a generally annular wall with a first helical spring channel defined therethrough, wherein at least one of the spring bases includes a liquid strainer.

3. A machined spring as recited in claim 2, wherein the liquid strainer includes a bulkhead separating a flow passage within the generally annular wall from a flow passage within the liquid strainer, wherein a plurality of bores are defined through the liquid strainer for passage of liquid from inside the generally annular wall through the bores and around the bulkhead to the exterior of a strainer mesh for straining liquid passing through the mesh into the flow passage within the liquid strainer.

4. A machined spring as recited in claim 2, wherein the liquid strainer includes a circumferential land extending outward from an upstream portion of the liquid strainer with a plurality of axial channels therethrough for passage of liquid out from inside the generally annular wall through the helical spring channels, through the axial channels to the exterior of a strainer mesh for straining liquid passing through the mesh into the flow passage within the liquid strainer.

5. A machined spring comprising:
opposed first and second spring bases separated apart along a longitudinal axis; and
a spring body connecting the first and second spring bases, wherein the spring body includes a generally annular wall with a first helical spring channel defined therethrough, wherein the first helical spring channel includes a radial aperture configured to permit uninterrupted liquid flow therethrough even when the first helical spring channel is compressed axially.

6. A machined spring comprising:
opposed first and second spring bases separated apart along a longitudinal axis; and
a spring body connecting the first and second spring bases, wherein the spring body includes a generally annular wall with a first helical spring channel defined therethrough, wherein at least one of the spring bases includes a valve cross-over configured and adapted to allow flow of liquid out from inside the generally annular wall through the valve cross-over for use in a valve.

7. A machined spring comprising:
opposed first and second spring bases separated apart along a longitudinal axis; and
a spring body connecting the first and second spring bases, wherein the spring body includes a generally annular wall with a first helical spring channel defined therethrough, wherein at least one of the spring bases includes a valve hold down component with an axially extending standoff configured to separate valve components within the generally annular wall from injector components outside the generally annular wall.

8. A machined spring comprising:
opposed first and second spring bases separated apart along a longitudinal axis; and
a spring body connecting the first and second spring bases, wherein the spring body includes a generally annular wall with a plurality of circumferential spring channels defined therethrough, wherein each circumferential spring channel winds circumferentially around a portion of the annular wall to provide flexibility in the direction of the longitudinal axis and stiffness in a torque direction around the longitudinal axis circumferentially, wherein each channel end includes an open enlarged terminus defined through the annular wall for reducing stress concentrations.

9. A machined spring as recited in claim 8, wherein there are a plurality of pairs of the spring channels, each pair having an axially extending wall section separating the two channels at each channel end.

10. A machined spring as recited in claim 9, wherein the axially extending wall sections between channel ends of each axially adjacent pair of channels are circumferentially offset from one another for increasing uniformity in longitudinal flexibility of the annular wall.

11. A machined spring as recited in claim 9, wherein the axially extending wall sections between channel ends of each axially adjacent pair of channels are circumferentially offset by about 90° from one another for increasing uniformity in longitudinal flexibility of the annular wall.

12. A fuel injector comprising:
an injector body having an upstream inlet end and opposed downstream end for injecting fluids therefrom;
a machined spring mounted between the upstream inlet and downstream ends of the injector body, the machined spring including:
opposed first and second spring bases separated apart along a longitudinal axis; and
a spring body connecting the first and second spring bases, wherein the spring body includes a generally annular wall with a plurality of machined spring channels defined therethrough, wherein the machined spring channels are helical and all wind in counter-rotational directions around the annular wall to increase uniform spring stiffness and reduce buckling of the spring body to one side under a substantially axial load.

13. A fuel injector comprising:
an injector body having an upstream inlet end and opposed downstream end for injecting fluids therefrom;
a machined spring mounted between the upstream inlet and downstream ends of the injector body, the machined spring including:
opposed first and second spring bases separated apart along a longitudinal axis; and
a spring body connecting the first and second spring bases, wherein the spring body includes a generally annular wall with a plurality of machined spring channels defined therethrough, wherein at least one of the spring bases includes a liquid strainer for straining liquids flowing through the injector body.

14. A fuel injector as recited in claim 13, wherein at least one of the machined spring channels includes a radial aperture configured to permit uninterrupted liquid flow therethrough even when the machined spring channels are compressed axially.

15. A fuel injector comprising:
an injector body having an upstream inlet end and opposed downstream end for injecting fluids therefrom:
a machined spring mounted between the upstream inlet and downstream ends of the injector body, the machined spring including:
opposed first and second spring bases separated apart along a longitudinal axis; and
a spring body connecting the first and second spring bases, wherein the spring body includes a generally annular wall with a plurality of machined spring channels defined therethrough; and
a valve mounted in the injector body to regulate liquid flow therethrough, wherein at least one of the spring bases includes a valve cross-over mounted in the valve to allow flow of liquid out from inside the generally annular wall through the valve cross-over under a predetermined pressure range applied at the inlet end of the injector body.

16. A fuel injector comprising:
an injector body having an upstream inlet end and opposed downstream end for injecting fluids therefrom;
a machined spring mounted between the upstream inlet and downstream ends of the injector body, the machined spring including:
opposed first and second spring bases separated apart along a longitudinal axis; and
a spring body connecting the first and second spring bases, wherein the spring body includes a generally annular wall with a plurality of machined spring channels defined therethrough; and
a valve mounted in the injector body to regulate liquid flow therethrough, wherein at least one of the spring bases includes a valve hold down component with an axially extending standoff separating the valve within the generally annular wall from injector components outside the generally annular wall.

17. A fuel injector comprising:
an injector body having an upstream inlet end and opposed downstream end for injecting fluids therefrom;
a machined spring mounted between the upstream inlet and downstream ends of the injector body, the machined spring including:
opposed first and second spring bases separated apart along a longitudinal axis; and
a spring body connecting the first and second spring bases, wherein the spring body includes a generally annular wall with a plurality of machined spring channels defined therethrough, wherein each machined spring channel is a circumferential spring channel that winds circumferentially around a portion of the annular wall to provide flexibility in the direction of the longitudinal axis and stiffness in a torque direction around the longitudinal axis circumferentially, wherein the first spring base is mounted to the inlet end of the injector body, wherein the second spring base is mounted to a feed arm of the injector, wherein a liquid conduit extends through the annular wall, and wherein the machined spring is configured and adapted to accommodate differential thermal expansion of the feed arm and liquid conduit and to provide stiffness to the inlet end of the injector body in torsion.

18. A fuel injector as recited in claim 17, wherein there are a plurality of pairs of the spring channels, each pair having an axially extending wall section separating the two channels at each channel end, and wherein the axially extending wall sections for each axially adjacent pair of channels are circumferentially offset.

\* \* \* \* \*